(12) United States Patent
Ide et al.

(10) Patent No.: US 7,373,051 B2
(45) Date of Patent: May 13, 2008

(54) OPTICAL DEVICE

(75) Inventors: Akiyoshi Ide, Kasugai (JP); Yasunori Iwasaki, Nishikasugai-Gun (JP)

(73) Assignee: NGK Insulators, Ltd., Nagoya (JP)

( * ) Notice: Subject to any disclaimer, the term of this patent is extended or adjusted under 35 U.S.C. 154(b) by 0 days.

(21) Appl. No.: 11/668,648

(22) Filed: Jan. 30, 2007

(65) Prior Publication Data

US 2007/0183720 A1    Aug. 9, 2007

(30) Foreign Application Priority Data

Feb. 3, 2006  (JP) ............................. 2006-026836
Dec. 20, 2006 (JP) ............................. 2006-342852

(51) Int. Cl.
*G02B 6/42* (2006.01)
*G02B 6/36* (2006.01)

(52) U.S. Cl. ........................... 385/47; 385/49; 385/88

(58) Field of Classification Search ............ 385/16–18, 385/20–24, 31, 36, 37, 39, 41–45
See application file for complete search history.

(56) References Cited

U.S. PATENT DOCUMENTS

| | | | | |
|---|---|---|---|---|
| 4,630,255 A | * | 12/1986 | Gouali et al. ................ 398/79 |
| 4,634,215 A | * | 1/1987 | Reule ........................... 385/43 |
| 4,961,801 A | * | 10/1990 | Gasparian ................... 156/153 |
| 5,031,984 A | * | 7/1991 | Eide et al. ..................... 385/27 |
| 6,327,407 B1 | * | 12/2001 | Mitsuda et al. ............... 385/49 |
| 6,406,196 B1 | | 6/2002 | Uno et al. |
| 6,535,655 B1 | * | 3/2003 | Hasui et al. .................. 385/11 |
| 6,731,837 B2 | * | 5/2004 | Goldberg et al. ............. 385/27 |
| 6,793,410 B2 | | 9/2004 | Nakanishi et al. |
| 6,850,674 B2 | | 2/2005 | Haraguchi et al. |
| 7,024,079 B2 | | 4/2006 | Komiya et al. |
| 7,308,174 B2 | | 12/2007 | Fukuyama et al. |
| 2005/0117831 A1 | | 6/2005 | Komiya et al. |

FOREIGN PATENT DOCUMENTS

DE    42 05 750 A1    8/1993

(Continued)

OTHER PUBLICATIONS

Kogyo Tsushin Co., Ltd., "Structure of triplexer type BI-DI", Drawing only (p. 38), OPTCOM No. 180, Mar. 2004, pp. 30-38 (and English translation of Drawing on p. 38).

(Continued)

*Primary Examiner*—Frank G. Font
*Assistant Examiner*—Charlie Peng
(74) *Attorney, Agent, or Firm*—Burr & Brown

(57) ABSTRACT

A first optical device has an optical fiber mount with an optical fiber disposed thereon, and an optical demultiplexer for demultiplexing a portion of an optical signal beam transmitted through the optical fiber, as a demultiplexed optical signal beam, and guiding the demultiplexed optical signal beam out of the optical fiber. The optical fiber has a first tapered surface for emitting the demultiplexed optical signal beam therethrough. The first tapered surface is inclined at an angle $\theta 1$ of at least 1° to an optical axis of the optical fiber. The distance (h) between the optical axis of the optical fiber and the first tapered surface is progressively greater along the direction in which the optical signal beam travels through the optical fiber.

16 Claims, 9 Drawing Sheets

FOREIGN PATENT DOCUMENTS

| | | |
|---|---|---|
| EP | 1 321 790 A2 | 6/2003 |
| JP | 1-307707 A1 | 12/1989 |
| JP | 2003-294990 | 10/2003 |
| JP | 2003-294992 | 10/2003 |
| JP | 2003-295000 | 10/2003 |
| WO | 03/060584 | 7/2003 |
| WO | 03/096095 | 11/2003 |
| WO | 03/098293 | 11/2003 |

OTHER PUBLICATIONS

Sato, Eisuke, et. al., "Optical Transceiver Module for Access Systems", Hitachi Communication Technologies, Ltd., OPTRON-ICS (2004), No. 1, pp. 172-177 (and partial English translation).

Matsuhiro, Keiji, et al., "Standards of Optical Fiber Arrays and Future Trend—Toward Expansion of Use of Collective Connection Products of Multi-core Optical Fiber", Optical Alliance, vol. 17, No. 11, Industrial Publishing Co., Ltd., Nov. 2005 (and partial English translation), pp. 4-6.

U.S. Appl. No. 11/668,661, filed Jan. 30, 2007, Ide et al.

* cited by examiner

10A

OPTICAL DEVICE

CROSS-REFERENCE TO RELATED APPLICATIONS

This application is based upon and claims the benefit of priority from Patent Application No. 2006-026836 filed on Feb. 3, 2006 and Patent Application No. 2006-342852 filed on Dec. 20, 2006, in the Japanese Patent Office, of which the contents are incorporated herein by reference.

BACKGROUND OF THE INVENTION

1. Field of the Invention

The present invention relates to an optical device suitable for use as a wavelength-multiplex optical terminal for demultiplexing a light beam in a particular wavelength range from signal light beams in various wavelength range, i.e., light beams of communication service signal or video signal, transmitted through an optical fiber.

2. Description of the Related Art

With the recent development of wavelength-multiplex communications using a fiber amplifier, it has become customary to monitor the amounts of optical signals at respective wavelengths, adjust the amounts of optical signals, and then have an amplifier amplify the optical signals in order to maintain desired amplifier characteristics.

Various processes are known for monitoring the amounts of optical signals. According to the known processes, since monitor devices are associated with respective optical fibers, they are alone required to have a considerable size.

There have been demands for a small-size monitor device which is packaged with high density. A monitor device monitors an optical signal by extracting a portion of the optical signal. It is desirable for a monitor device to be able to monitor an optical signal without significantly attenuating the optical signal.

Heretofore, solutions to the above problems and demands have been proposed in Japanese Laid-Open Patent Publication No. 2003-294990, Japanese Laid-Open Patent Publication No. 2003-294992, Japanese Laid-Open Patent Publication No. 2003-295000, WO03/096095, WO03/060584, and WO03/098293.

In recent years, attempts have been made to add broadcasting services as new value-added services to FTTH (Fiber To The Home) services. A broadcasting down signal wavelength is added to upstream and downstream signal wavelengths of IP (Internet Protocol) services through a single optical fiber in the new services. In other words, combined services for communication and broadcasting by the single-core, three-wavelength optical fiber have been proposed.

In order to realize such combined communication and broadcasting services, a customer premises facility is required to include a B-ONU (Broadband Optical Network Unit) that is need for conventional IP services and a V-ONU (Video-Optical Network Unit) for receiving broadcasting services. Stated otherwise, the subscriber needs to have a wavelength-multiplexing optical terminal for processing upstream and downstream signals having different wavelengths. In the future, there is a possibility to transmit a downstream video signal at another wavelength, and a wavelength-multiplexing optical terminal for three wavelengths will be required to handle all those signals.

The wavelength-multiplex optical terminal mainly comprises a WDM (Wavelength Division Multiplexing) filter, a light-detecting unit (e.g., a photodiode) for receiving a downstream signal, and a light-emitting device (e.g., a laser diode) for transmitting an upstream signal.

For demultiplexing wavelengths with WDM filters, ordinary filters are required to have an attenuating level of about 25 dB in the cut-off range, but filters designed to meet special specifications are required to have an attenuating level of about 40 dB in the cut-off range. As shown in OPTCOM, March 2004, page 38, a bandpass filter (rejection filter) may be inserted between a WDM prism and a light-detecting unit.

Conventional wavelength-multiplexing optical terminals are mainly classified into a microoptics design using a lens and a PLC design using an optical waveguide, as shown in OPTORONICS, January 2004, page 173.

Since both designs employ a light transmitting component such as a lens or an optical waveguide for guiding optical signals to a WDM filter, it is necessary to meet a most important requirement for optical components, i.e., optical alignment between the optical fiber and the light transmitting component. Accordingly, the cost of the resultant assembly tends to be high and the connection is liable to be of low reliability.

For providing combined communication and broadcasting services inexpensively, there has been proposed a V-ONU-compatible optical device having an integrated combination of a WDM function based on the microslitting technology (see "Standards of optical fiber arrays and future trend", OPTICAL ALLIANCE, November 2005) for directly slitting an optical fiber, and a light-detecting function.

The V-ONU-compatible optical device fabricated according to the microslitting technology comprises a wavelength-demultiplexing thin-film substrate inserted in an oblique silt directly defined in an optical fiber and a light-detecting component disposed above the optical fiber for detecting an optical signal bean demultiplexed by the wavelength-demultiplexing thin-film substrate. The V-ONU-compatible optical device thus constructed is inexpensive to manufacture, and yet incorporates an integrated combination of the wavelength-demultiplexing function and the light-detecting function.

SUMMARY OF THE INVENTION

It is an object of the present invention to provide an optical device fabricated according to the microslitting technology, which is capable of suppressing level variations of a demultiplexed optical signal, i.e., level variations of an electric signal converted from the demultiplexed optical signal, even in the presence of refractive index fluctuations and temperature fluctuations of components of the optical device, for achieving stable reception sensitivity.

An optical device according to the present invention comprises an optical fiber mount with an optical fiber disposed thereon, and an optical demultiplexer for demultiplexing a portion of an optical signal beam transmitted through the optical fiber, as a demultiplexed optical signal beam, and guiding the demultiplexed optical signal beam out of the optical fiber, the optical fiber having a tapered surface for emitting the demultiplexed optical signal beam therethrough.

The optical demultiplexer may have a slit defined in the optical fiber across an optical axis thereof, and an optical demultiplexing member inserted in the slit for demultiplexing the portion of the optical signal beam transmitted through the optical fiber.

If the optical fiber does not have the tapered surface, then the surface of the optical fiber and the optical axis of the optical fiber are parallel to each other. The optical signal beam demultiplexed by the optical demultiplexer (the demultiplexed optical signal beam) passes through the cladding layer of the optical fiber and the surface of the optical fiber, and then through a substance that is present on the surface of the optical fiber.

If the refractive index of the substance is smaller than the refractive index of the cladding layer, then when the angle of incidence of the demultiplexed optical signal beam on the surface of the optical fiber is equal to or greater than a certain angle of incidence, the demultiplexed optical signal beam occurs total internal reflection at the surface of the optical fiber. The level (amount of light) of the demultiplexed optical signal beam that passes through the surface of the optical fiber is reduced, resulting in problems that a signal level (voltage level or current level) of the demultiplexed optical signal beam which is detected by a light-detecting unit may be reduced or the demultiplexed optical signal beam may not reach the light-detecting unit. The refractive index of the substance may become smaller than the refractive index of the cladding layer when the substance is a refractive index matching agent (adhesive), for example, and the refractive index of the refractive index matching agent varies due to a temperature change and becomes lower than the refractive index of the cladding layer.

When the angle of incidence of the demultiplexed optical signal beam on the surface of the optical fiber is large, furthermore, the substance acts more as substance for forming a boundary surface than its function as a refractive index matching agent (adhesive), occurring total internal reflection of the demultiplexed optical signal beam if the angle of incidence of the demultiplexed optical signal beam is equal to or greater than a certain angle of incidence.

According to the present invention, on the other hand, since the optical fiber has the tapered surface from which the demultiplexed optical signal beam is emitted from the optical fiber, the angle of incidence of the demultiplexed optical signal beam on the surface of the optical fiber is reduced by the tapered surface. Accordingly, even if the refractive index of the substance on the surface of the optical fiber varies, level variations of the demultiplexed optical signal beam (signal level variations of an electric signal converted from the demultiplexed optical signal beam) are reduced for stable reception sensitivity.

The optical device according to the present invention can be used to realize wavelength filter components, wavelength-multiplex reception devices, and transmission/reception devices without the need for lenses and optical transmission devices.

According to the present invention, the tapered surface should preferably be inclined at an angle of at least 1° to an optical axis of the optical fiber. If the angle is too small, then machining variations of components of the optical device prevent the angle of incidence of the demultiplexed optical signal beam from being increased. In view of the diffraction angle (spreading angle) of the demultiplexed optical signal beam, the angle should preferably be 1° or greater.

According to the present invention, the tapered surface should preferably be spaced from an optical axis of the optical fiber by a distance which is progressively greater along a direction in which the optical signal beam travels through the optical fiber. With this arrangement, the angle of incidence of the demultiplexed optical signal beam on the surface of the optical fiber is reduced by the tapered surface.

According to the present invention, the optical device may further comprises an optical path changer for changing an optical path of the demultiplexed optical signal beam guided out of the optical fiber, a waveguide serving as at least a medium from which the demultiplexed optical signal beam is emitted to the optical path changer, and a filter disposed on a surface of the waveguide.

A wavelength filter component can be produced by inserting a WDM filter into the slit, and a wavelength-multiplex reception device can be produced by installing a light-detecting unit for detecting the demultiplexed optical signal beam which has been guided out of the optical fiber from the optical demultiplexer.

The demultiplexed optical signal beam which has been guided out of the optical fiber has its optical path changed by the optical path changer and passes through the waveguide. By installing the light-detecting unit on the optical path of the demultiplexed optical signal beam emitted from the waveguide, the demultiplexed optical signal beam applied to the light-detecting unit can have its angle of incidence (the angle formed between the applied beam and the line normal to the light-detecting surface) reduced for better light-detecting characteristics.

With the filter being in the form of a bandpass filter, the filter can provide better characteristics (a desired attenuating level in the cut-off range) if the angle of incidence of the beam on the filter is smaller. If the angle of incidence of the beam on the filter is simply to be reduced, then the optical path changer for reducing the angle of incidence needs to be provided between the optical demultiplexer and the light-detecting unit, and the filter needs to be provided between the optical path changer and the light-detecting unit. Therefore, the optical path from the optical demultiplexer to the light-detecting unit has an increased length tending to increase the loss.

According to the present embodiment, however, at least a medium from which the beam is emitted to the optical path changer comprises the waveguide, and the filter is disposed on the surface of the waveguide. Consequently, the angle of incidence of the beam on the filter is reduced, and the length of the optical path from the optical demultiplexer to the light-detecting unit is prevented from being increased. Furthermore, the medium from which the beam is emitted (reflected) to the optical path changer and the medium from which the beam is applied to the filter are identical to each other. Therefore, the medium is optically uniform for better and stable characteristics.

If the waveguide serves as both a medium from which the beam is emitted to the optical path changer and to which the beam is emitted from the optical path changer, then not only the beam is emitted (reflected) to the optical path changer and applied to the bandpass filter, but also the beam is applied to the optical path changer, through the same medium to achieve a more uniform optical path.

According to the present invention, the optical demultiplexer may comprise a wavelength demultiplexing filter and the film may comprises a bandpass filter for passing a light beam in a particular wavelength range of the demultiplexed optical signal beam. The bandpass filter may have an attenuating level of about 40 dB, for example, in the cut-off range, providing increased isolation between the pass range and the cut-off range.

For reducing the length of the optical path and increasing the optical uniformity of the optical path of the demultiplexed optical signal beam, the waveguide may be disposed directly above the optical fiber. In this case, a refractive index matching agent may be placed between at least a surface of the optical fiber and the waveguide.

The waveguide may have a surface facing a surface of the optical fiber and extending substantially parallel to the optical axis of the optical fiber. Alternatively, the waveguide may have a tapered surface facing a surface of the optical fiber. If the waveguide has a tapered surface, then the angle of incidence of the demultiplexed optical signal beam on the surface (the tapered surface) of the optical fiber and the angle of incidence of the demultiplexed optical signal beam on the surface of the waveguide are reduced. Thus, even if components of the optical device suffer refractive index variations, the optical device has stable reception sensitivity.

The tapered surface of the waveguide may extend substantially parallel to the tapered surface of the optical fiber. The tapered surface of the optical fiber may be inclined at an angle θ1 to the optical axis of the optical fiber, and the tapered surface of the waveguide may be inclined at an angle θ2 to the optical axis of the optical fiber, the angle θ1 and the angle θ2 being different from each other.

According to the present invention, the optical path changer may comprise a guide, the waveguide and the guide being juxtaposed on a surface of the optical fiber, and a totally reflecting film disposed on an end face of the guide which faces the waveguide.

The tapered surface of the optical fiber may double as a positioning member for positioning the guide with respect to the optical fiber.

According to the present invention, the optical path changer may comprise a totally reflecting film disposed on an end face of the waveguide which is present on the optical path of the demultiplexed optical signal beam. With this arrangement, the guide which is referred to above may be dispensed with.

According to the present invention, the tapered surface of the optical fiber may comprise a side surface of a V-shaped groove defined in a surface of the optical fiber. The V-shaped groove may have another side surface doubling as a positioning member for positioning the waveguide with respect to the optical fiber.

As described above, with the optical device according to the present invention, which may be fabricated according to the microslitting technology, level variations of the demultiplexed optical signal beam (signal level variations of an electric signal converted from the demultiplexed optical signal beam) are reduced for stable reception sensitivity even in the presence of refractive index fluctuations and temperature fluctuations of components of the optical device.

The above and other objects, features, and advantages of the present invention will become more apparent from the following description when taken in conjunction with the accompanying drawings in which preferred embodiments of the present invention are shown by way of illustrative example.

DESCRIPTION OF THE PREFERRED EMBODIMENTS

Figure 1:
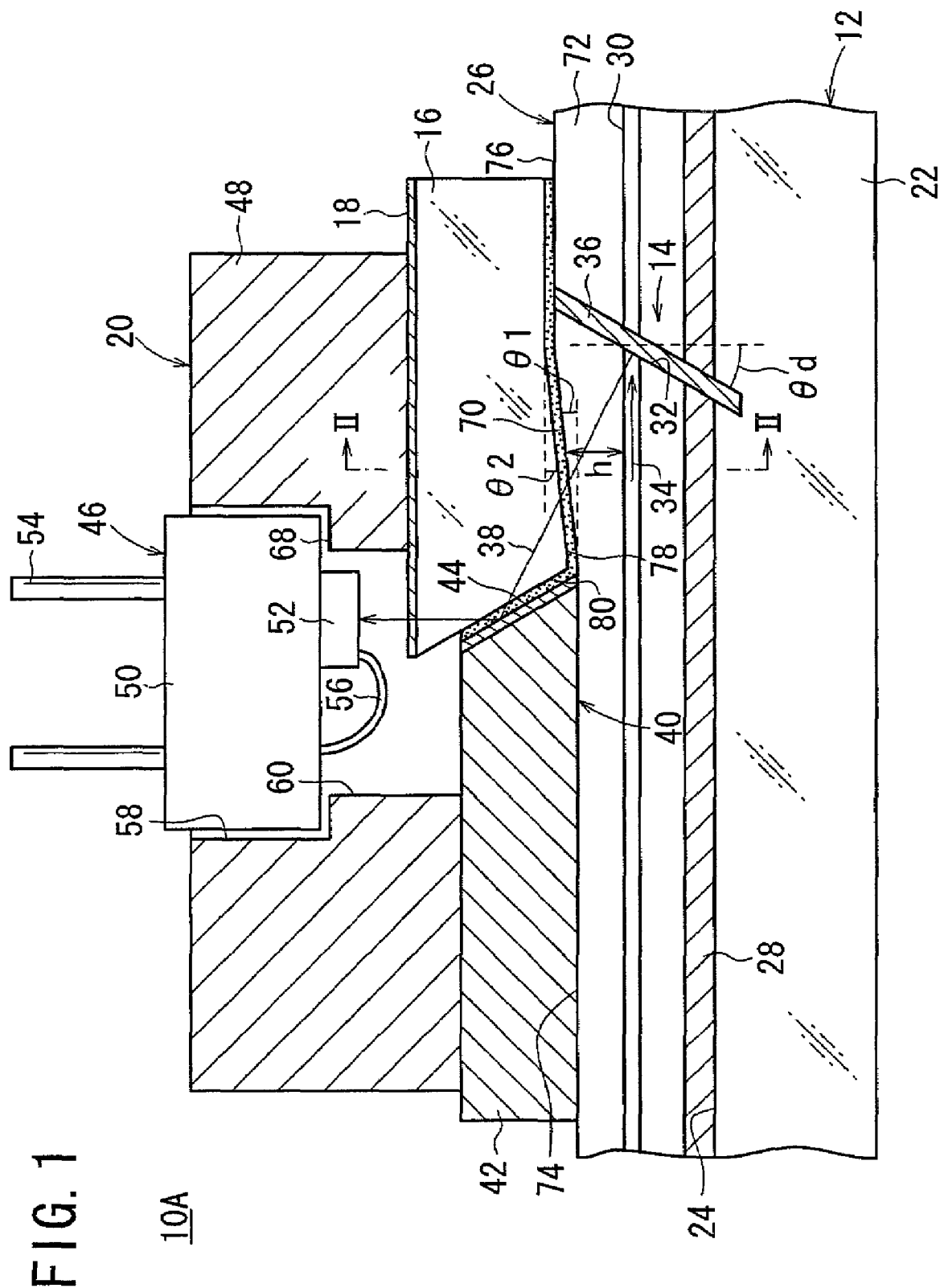
FIG. 1 is a fragmentary cross-sectional view of a first optical device according to the present invention.

Optical devices according to embodiments of the present invention will be described below with reference to FIGS. 1 through 9. Like or corresponding parts are denoted by like or corresponding reference characters throughout views.

Figure 2:
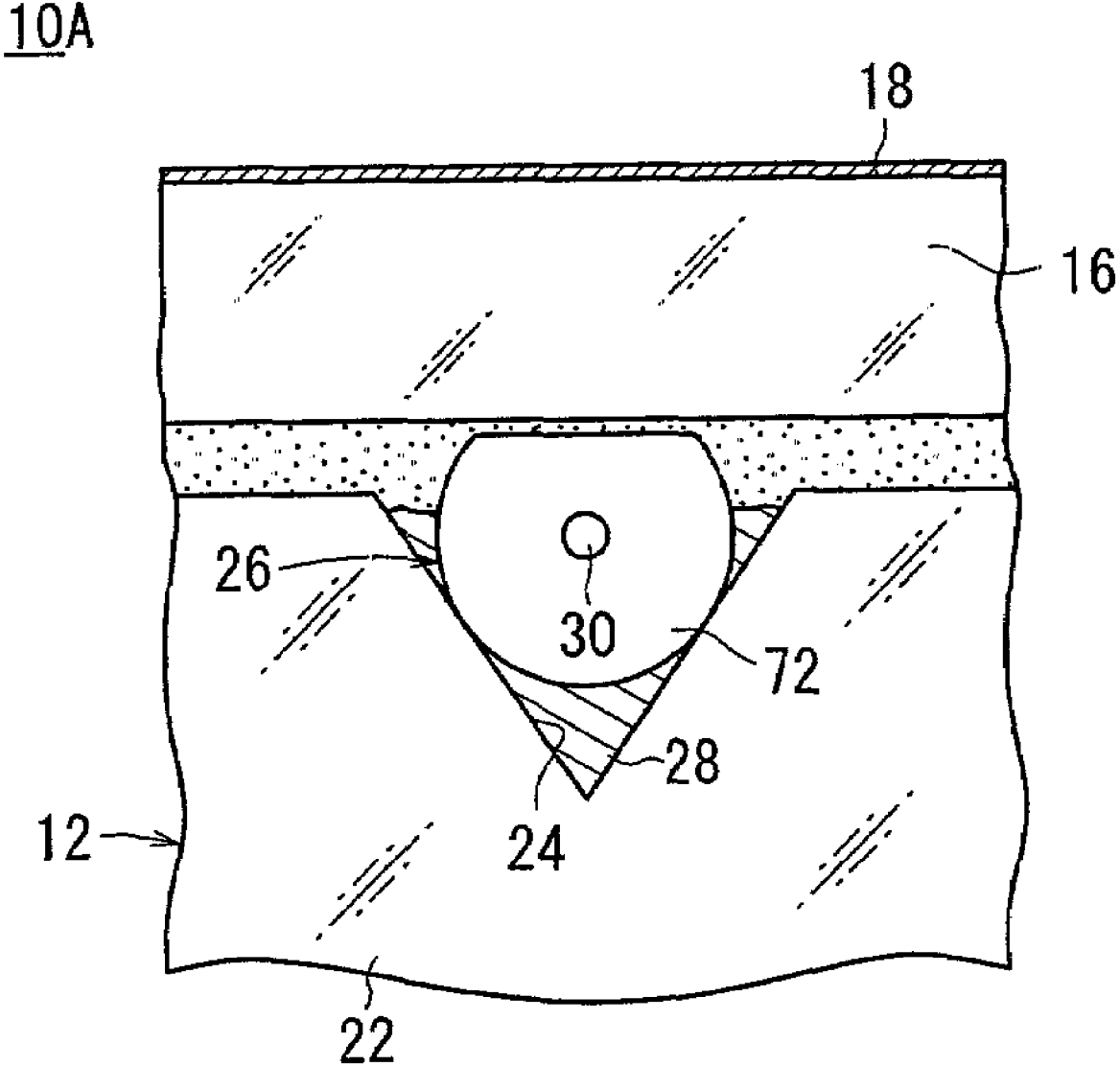
FIG. 2 is an enlarged cross-sectional view of the optical device taken along line II-II of FIG. 1.

As shown in FIGS. 1 and 2, an optical device according to a first embodiment of the present invention (hereinafter referred to as a first optical device 10A) comprises an optical fiber mount 12, an optical demultiplexer 14, a waveguide 16, a filter 18, and a light-detecting unit 20.

The optical fiber mount 12 comprises a glass substrate 22 with at least one fixing groove 24 in the form of a V-shaped groove (see FIG. 2) or a semicircular groove defined therein. An optical fiber 26 is fixedly secured in the fixing groove 24 by a securing adhesive 28.

The optical demultiplexer 14 has a slit 32 which is defined in the optical fiber 26 and the optical fiber mount 12 and extends obliquely across the optical axis of a core 30 of the optical fiber 26, and an optical demultiplexing member 36 inserted in the slit 32 for demultiplexing a portion of an optical signal beam 34 transmitted through the optical fiber 26, as a demultiplexed optical signal beam 38. The demultiplexed optical signal beam 38 from the optical demultiplexing member 36 is guided out of the optical fiber 26. The optical demultiplexing member 36 inserted in the slit 32 comprises a wavelength-division multiplexing filter (WDM filter) for demultiplexing an optical signal beam component in a certain wavelength range from the optical signal beam 34 transmitted through the optical fiber 26. The optical demultiplexing member 36 comprises a multilayer film disposed on the surface of a quartz glass sheet.

The slit 32 extends obliquely across the optical axis of the core 30 of the optical fiber 26 and has its lower end positioned below the bottom of the fixing groove 24. The slit 32 should preferably have a width ranging from 5 to 50 μm. If the width of the slit 32 is smaller than 5 μm, then the optical demultiplexing member 36 is too thin to be inserted easily in the slit 32. If the width of the slit 32 is greater than 50 μm, then the optical demultiplexing member 36 causes too large excess loss to lend itself to actual specifications. The depth of the slit 32 should preferably be in the range from 130 to 250 μm. If the depth of the slit 32 is smaller than 130 μm, then the fixing groove 24 may possibly terminate somewhere in the optical fiber 26 while it is being formed, and may possibly tend to serve as a starting point for causing damage to the optical fiber 26. If the depth of the slit 32 is greater than 250 μm, it may possibly invite a reduction in the mechanical strength of the glass substrate 22. A refractive index matching agent is placed between inner wall surfaces of the slit 32 and the optical demultiplexing member 36. In the present embodiment, the slit 32 has a width of 30 μm and is inclined to a line perpendicular to the optical axis of the optical fiber 26 by an angle θd of 8°. The line perpendicular to the optical axis of the optical fiber 26 will be referred to as a perpendicular line.

The filter 18 is disposed on the surface of the waveguide 16. The filter 18, which comprises a thin film, serves as a bandpass filter (BPF) for passing an optical signal beam in a particular wavelength range of the demultiplexed optical signal beam 38 from the optical demultiplexer 14. The BPF 18 has an attenuating level of about 40 dB in the cut-off range for the demultiplexed optical signal beam 38 from the optical demultiplexer 14, providing increased isolation between the pass range and the cut-off range.

An optical path changer 40 is disposed on the surface of the optical fiber 26 in juxtaposed relation to the waveguide 16. The optical path changer 40 is arranged to change the optical path of the demultiplexed optical signal beam 38 that has been guided out of the optical fiber 26.

Particularly, the optical path changer 40 of the first optical device 10A comprises a guide 42 made of glass or ceramics, for example, and a totally reflecting film 44 (totally reflecting mirror) disposed on an end face of the guide 42 which faces the waveguide 16. The end face of the guide 42 and an end face of the waveguide 16 which faces the guide optical path changer 40 are inclined through substantially the same angle. The guide 42 functions as a positioning member for mounting the waveguide 16 and also as a fixing member for securing the waveguide 16 in place.

The light-detecting unit 20 is disposed on the optical path of the demultiplexed optical signal beam 38 that has passed through the filter 18. The light-detecting unit 20 comprises a CAN-type photodiode 46 and a housing 48 housing the photodiode 46 therein.

The photodiode 46 has a base 50 and a chip 52 mounted on the base 50 and having a light-detecting surface. A wiring pattern (not shown) for electrical connection to a plurality of external terminals 54 is disposed on the base 50. The chip 52 is electrically connected to the wiring pattern by bonding wires 56. The housing 48 has a first through hole 58 defined therein which houses the photodiode 46 therein and a second through hole 60 defined therein which communicates with the first through hole 58. The demultiplexed optical signal beam 38 that has passed through the filter 18 passes through the second through hole 60. The second through hole 60 has an opening width smaller than the transverse width of the base 50. The second through hole 60 accommodates therein a light transmission medium which may be an adhesive having a refractive index that is substantially the same as the refractive index of the optical fiber 26 and the waveguide 16. The light transmission medium may alternatively be air.

If the light-detecting device is disposed over the substrate and has its light-detecting surface positioned on the optical path of the demultiplexed optical signal beam 38 from the optical demultiplexer 14, the light-detecting device may be mounted on the optical fiber mount 12 with a spacer interposed therebetween. However, since the optical path changer 40 and the waveguide 16 exist on the optical fiber 26, if such a spacer is employed, then difficulty arises in assembling and manufacturing the optical device, making it costly to manufacture the optical device.

With the first optical device 10A, the photodiode 46 is accommodated in the first through hole 58 defined in the housing 48 of the light-detecting unit 20, and the demultiplexed optical signal beam 38 from the optical demultiplexer 14 passes through the second through hole 60 which communicates with the first through hole 58 and has an opening width smaller than the transverse width of the base 50 of the photodiode 46. A step 62 disposed between the first through hole 58 and the second through hole 60 serves as a spacer for the photodiode 46. Since the photodiode 46 can be installed in place simply by placing the housing 48 on the guide 42 and the waveguide 16, the first optical device 10A can easily be assembled and manufactured at a low cost.

The optical fiber 26 has a tapered surface 70 (hereinafter referred to as a first tapered surface 70) from which the demultiplexed optical signal beam 38 is emitted from the optical fiber 26 in the first optical device 10A.

The first tapered surface 70 is inclined to the optical axis of the optical fiber 26 by an angle θ1 of 1° or greater.

The distance h between the optical axis of the optical fiber 26 and the first tapered surface 70 is progressively greater along the direction in which the optical signal beam 34 travels, i.e., to the right in FIG. 1.

Specifically, the optical fiber 26 has a cladding layer 72 including a step defined axially between a lower step surface 74 and a higher step surface 76 of the cladding 25 layer 72. The guide 42 of the optical path changer 40 is disposed on the lower step surface 74, and the waveguide 16 is disposed on the first tapered surface 70 and the higher step surface 76, i.e., an upper surface of the cladding layer 72 having a regular thickness. In FIG. 1, the waveguide 16 has a tapered surface 78 (hereinafter referred to as a second tapered surface 78) facing and held against the first tapered surface 70 of the optical fiber 26.

A gap between the surface of the optical fiber 26 and the waveguide 16 and a gap between the waveguide 16 and the optical path changer 40 are filled with a refractive index matching agent (adhesive) 80.

Operation of the first optical device 10A will be described below. An optical signal beam component in a particular wavelength range of the optical signal beam 34 transmitted through the optical fiber 26 is demultiplexed by the optical demultiplexer 14, and guided as the demultiplexed optical signal beam 38 out of the optical fiber 26. Other optical signal beam components are transmitted as the optical signal beam 34 through the optical fiber 26.

The demultiplexed optical signal beam 38 that is guided out of the optical fiber 26 travels successively through the cladding layer 72, the first tapered surface 70, the refractive index matching agent 80, and the second tapered surface 78, and enters the waveguide 16. In the waveguide 16, the demultiplexed optical signal beam 38 travels substantially straight to the end face of the waveguide 16 and the refractive index matching agent 80, and then is applied to and reflected by the totally reflecting film 44 of the optical path changer 40 to change its optical path. The demultiplexed optical signal beam 38 is then propagated along the normal line of the waveguide 16 and perpendicularly passes through the filter 18 on the surface of the waveguide 16. Since the demultiplexed optical signal beam 38 is attenuated about 40 dB in the cut-off range by the filter 18, the demultiplexed optical signal beam 38 is characterized by enhanced isolation between the pass range and the cut-off range.

Figure 3:
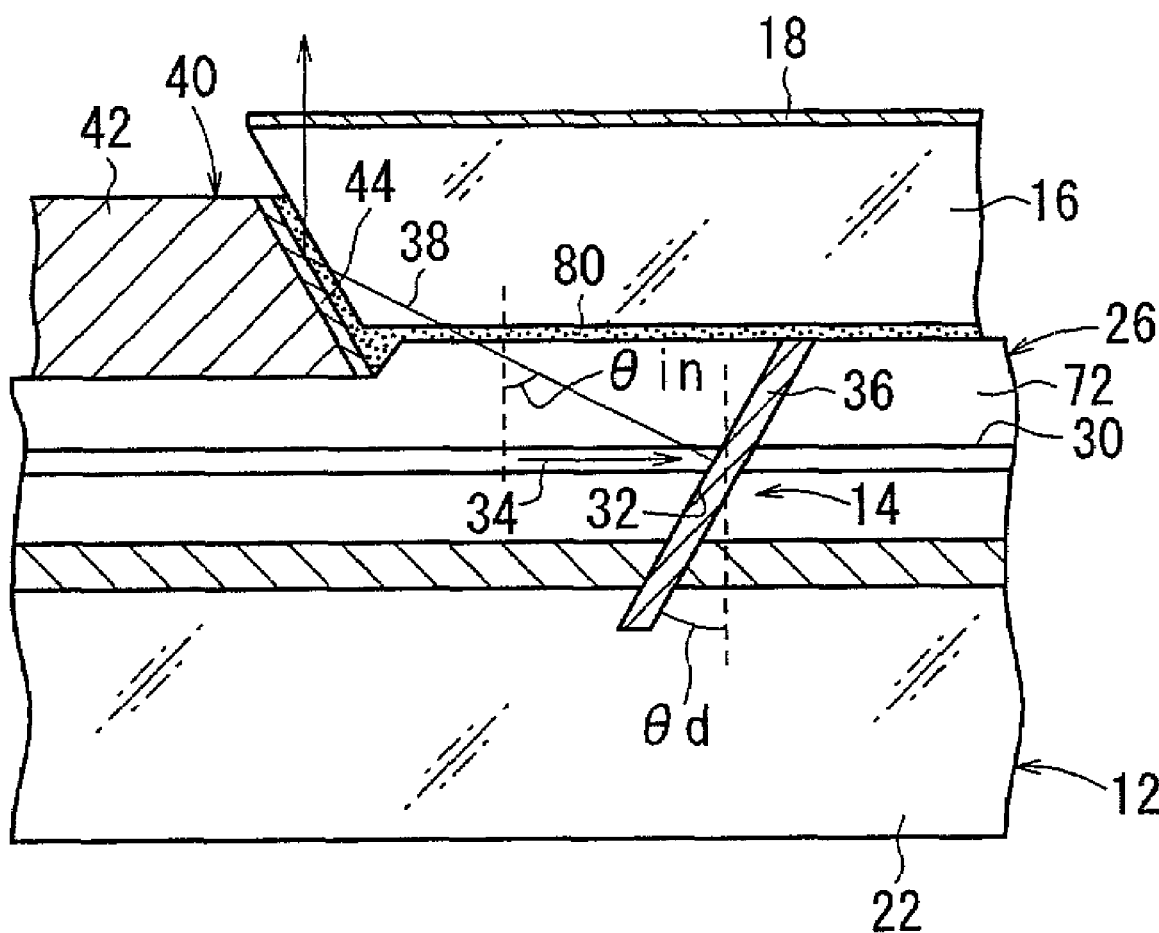
FIG. 3 is a fragmentary cross-sectional view of an optical device according to a comparative example.

Operation of the first optical device A as compared with an optical device 200 according to a comparative example shown in FIG. 3 will be described below. In FIG. 3, a light-detecting unit 20 is omitted from illustration.

As shown in FIG. 3, the optical device 200 according to the comparative example is free of the first tapered surface 70 (see FIG. 1) on the optical fiber 26, and has the surface of the optical fiber 26 extending parallel to the optical axis of the optical fiber 26. An optical signal beam demultiplexed by the optical demultiplexer 14 (demultiplexed optical signal beam 38) passes through the cladding layer 72, the surface of the optical fiber 26, and the refractive index matching agent 80, and then enters the waveguide 16.

If the refractive index of the refractive index matching agent 80 is smaller than the refractive index of the cladding layer 72, then when the angle of incidence of the demultiplexed optical signal beam 38 on the surface of the optical fiber 26 is equal to or greater than a certain angle of incidence, the demultiplexed optical signal beam 38 occurs total internal reflection at the surface of the optical fiber 26. The level (amount of light) of the demultiplexed optical signal beam 38 that passes through the surface of the optical fiber 26 is reduced, resulting in problems that a signal level (voltage level or current level) of the demultiplexed optical signal beam 38 which is detected by the photodiode 46 (see FIG. 1) may be reduced or the demultiplexed optical signal beam 38 may not reach the chip 52 of the photodiode 46. The refractive index of the refractive index matching agent 80 may become smaller than the refractive index of the cladding layer 72 when the refractive index of the refractive index matching agent 80 varies due to a temperature change and becomes lower than the refractive index of the cladding layer 72.

When the angle of incidence of the demultiplexed optical signal beam 38 on the surface of the optical fiber 26 is large, furthermore, the refractive index matching agent 80 acts more as a substance (thin film) for forming a boundary surface than as a refractive index matching agent, occurring total internal reflection of the demultiplexed optical signal beam 38 if the angle of incidence of the demultiplexed optical signal beam 38 is equal to or greater than a certain angle of incidence.

With the first optical device 10A, on the other hand, since the optical fiber 26 has the first tapered surface 70 from which the demultiplexed optical signal beam 38 is emitted from the optical fiber 26, the angle of incidence of the demultiplexed optical signal beam 38 on the surface of the optical fiber 26 is reduced by the first tapered surface 70. Accordingly, even if the refractive index of the refractive index matching agent 80 on the surface of the optical fiber 26 varies, level variations of the demultiplexed optical signal beam 38 (signal level variations of an electric signal converted from the demultiplexed optical signal beam 38) are reduced for stable reception sensitivity.

According to the present embodiment, the angle θ1 of the first tapered surface 70 with respect to the optical axis of the optical fiber 26 should preferably be 1° or greater. If the angle θ1 is too small, then machining variations of components of the first optical device 10A undercut the effect of a large angle of incidence of the demultiplexed optical signal beam 38. Even in view of the diffraction angle (spreading angle) of the demultiplexed optical signal beam 38, the angle θ1 should preferably be 1° or greater.

Furthermore, inasmuch as the distance h between the optical axis of the optical fiber 26 and the first tapered surface 70 is progressively greater along the direction in which the optical signal beam 34 travels, the angle of incidence of the demultiplexed optical signal beam 38 on the surface of the optical fiber 26 are reduced by the first tapered surface 70.

Moreover, because the waveguide 16 has the second tapered surface 78 which faces the first tapered surface 70 of the optical fiber 26, the angle of incidence of the demultiplexed optical signal beam 38 on the surface (the first tapered surface 70) of the optical fiber 26 and the angle of incidence of the demultiplexed optical signal beam 38 on the surface (the second tapered surface 78) of the waveguide 16 are reduced. Thus, even if components of the first optical device 10A suffer refractive index variations, the first optical device 10A has stable reception sensitivity.

With the optical device 200 according to the comparative example, variations of the light-detecting efficiency of the photodiode 46 (see FIG. 1) were of less than 0.8 dB because of the thin film interference caused by the refractive index matching agent 80. According to the present embodiment, variations of the light-detecting efficiency of the photodiode 46 are improved to less than 0.4 dB. The temperature dependency of the light-detecting efficiency of the photodiode 46 was of less than 1 dB with the optical device 200 according to the comparative example, but is improved to less than 0.6 dB according to the present embodiment.

According to the present embodiment, since the first tapered surface 70 on the surface of the optical fiber 26 doubles as a positioning member for positioning the optical path changer 40 with respect to the optical fiber 26, the first optical device 10A can be assembled with ease.

The first optical device 10A can be used to realize wavelength filter components, wavelength-multiplexing receiving devices, and transmitting/receiving devices without the need for lenses and optical transmission devices.

A wavelength filter component can be produced by inserting the wavelength demultiplexing filter into the slit 32, and a wavelength-multiplexing receiving device can be produced by installing the photodiode 46 for detecting the demultiplexed optical signal beam 38 which has been guided out of the optical fiber 26 from the optical demultiplexer 14.

The demultiplexed optical signal beam 38 which has been guided out of the optical fiber 26 passes through the waveguide 16 and has its optical path changed by the optical path changer 40, and thereafter is transmitted through the waveguide 16. By installing the photodiode 46 on the optical path of the demultiplexed optical signal beam 38 emitted from the waveguide 16, the demultiplexed optical signal beam 38 applied to the photodiode 46 can have its angle of incidence (the angle formed between the applied beam and the normal line of the light-detecting surface) reduced for better light-detecting characteristics.

With the filter 18 being in the form of a BPF, the filter 18 can provide better characteristics (a desired attenuating level in the cut-off range) if the angle of incidence of the beam on the filter 18 is smaller. If the angle of incidence of the beam on the filter 18 is simply to be reduced, then the optical path changer 40 for reducing the angle of incidence needs to be provided between the optical demultiplexer 14 and the photodiode 46, and the filter 18 needs to be provided between the optical path changer 40 and the photodiode 46. Therefore, the optical path from the optical demultiplexer 14 to the photodiode 46 has an increased length tending to increase the loss.

According to the present embodiment, however, a medium from which the beam is emitted to the optical path changer 40 or a medium from which the beam is emitted to the optical path changer 40 and to which the beam is emitted from the optical path changer 40 comprises the waveguide 16, and the filter 18 is disposed on the waveguide 16. Consequently, the angle of incidence of the beam on the filter 18 is reduced, and the length of the optical path from the optical demultiplexer 14 to the photodiode 46 is prevented from being increased. Furthermore, the medium from which the beam is emitted to the optical path changer 40 and the medium from which the beam is applied to the filter 18 are identical to each other, i.e., the waveguide 16. Therefore, the medium is optically uniform for better and stable characteristics.

As described above, the optical demultiplexing member 36 comprises a wavelength demultiplexing filter and the filter 18 comprises a BPF. Therefore, the attenuating level in the cut-off range may be of about 40 dB, for example, providing increased isolation between the pass range and the cut-off range.

Because the waveguide 16 is disposed directly above the optical fiber 26, the length of the optical path of the demultiplexed optical signal beam 38 is reduced, and the thickness of the refractive index matching agent 80 disposed between the optical fiber 26 and the waveguide 16 is also reduced. The optically unstable region (adhesive layer) is thus reduced for enhanced optical uniformity of the demultiplexing optical path.

Modifications of the first optical device 10A will be described below with reference to FIGS. 4 through 7.

Figure 4:
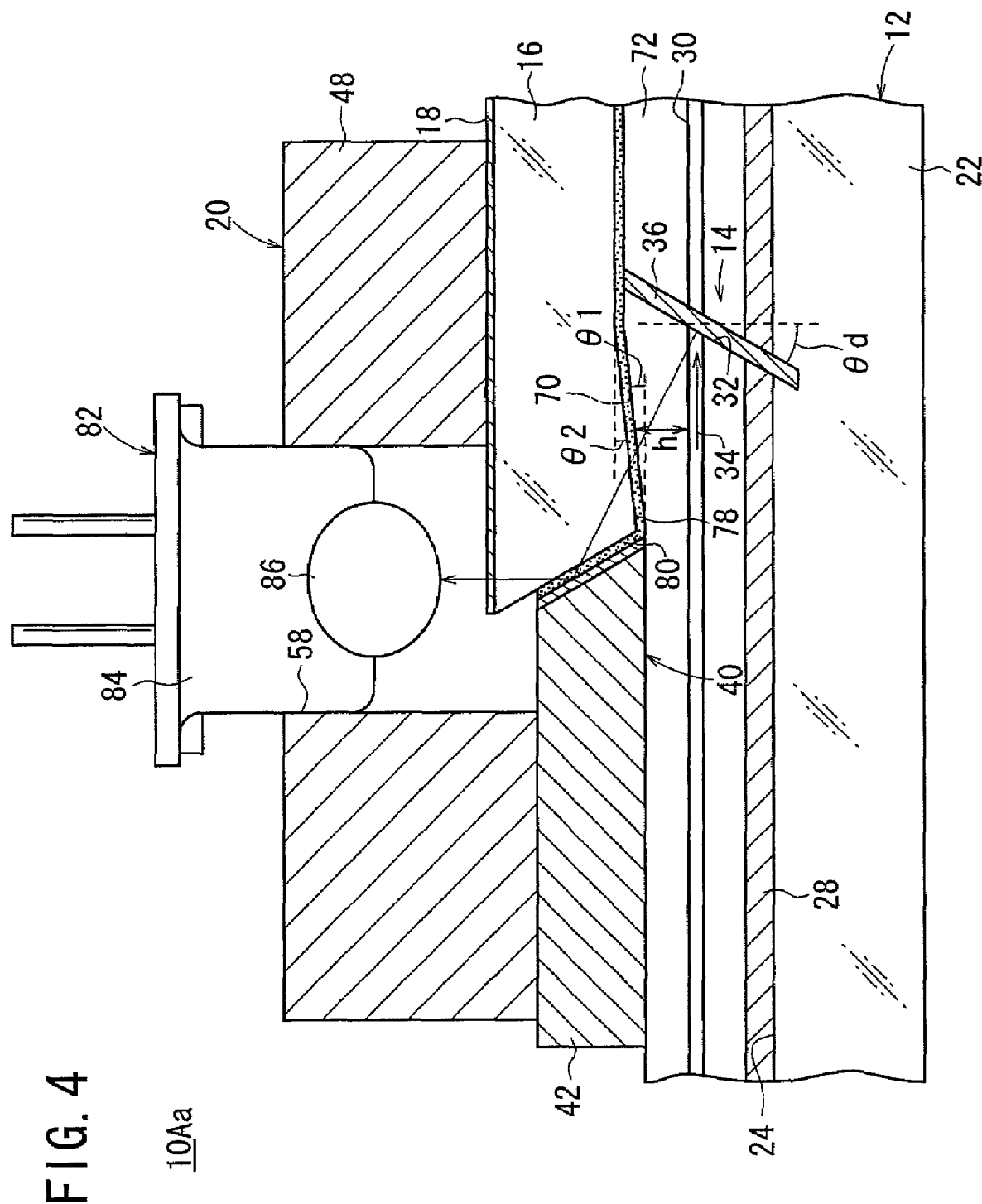
FIG. 4 is a fragmentary cross-sectional view of a first modification of the first optical device.

As shown in FIG. 4, an optical device 10Aa according to a first modification differs from the first optical device 10A in that a lens-combined CAN-type photodiode 82 is accommodated in the first through hole 58 in the housing 48.

The lens-combined CAN-type photodiode 82 comprises a CAN-type photodiode 84 and a ball lens 86 mounted thereon which has a diameter of 1.5 mm, for example. The ball lens 86 is accommodated in the first through hole 58 such that it faces the filter 18, thereby designing the optical device 10Aa with ease.

Figure 5:
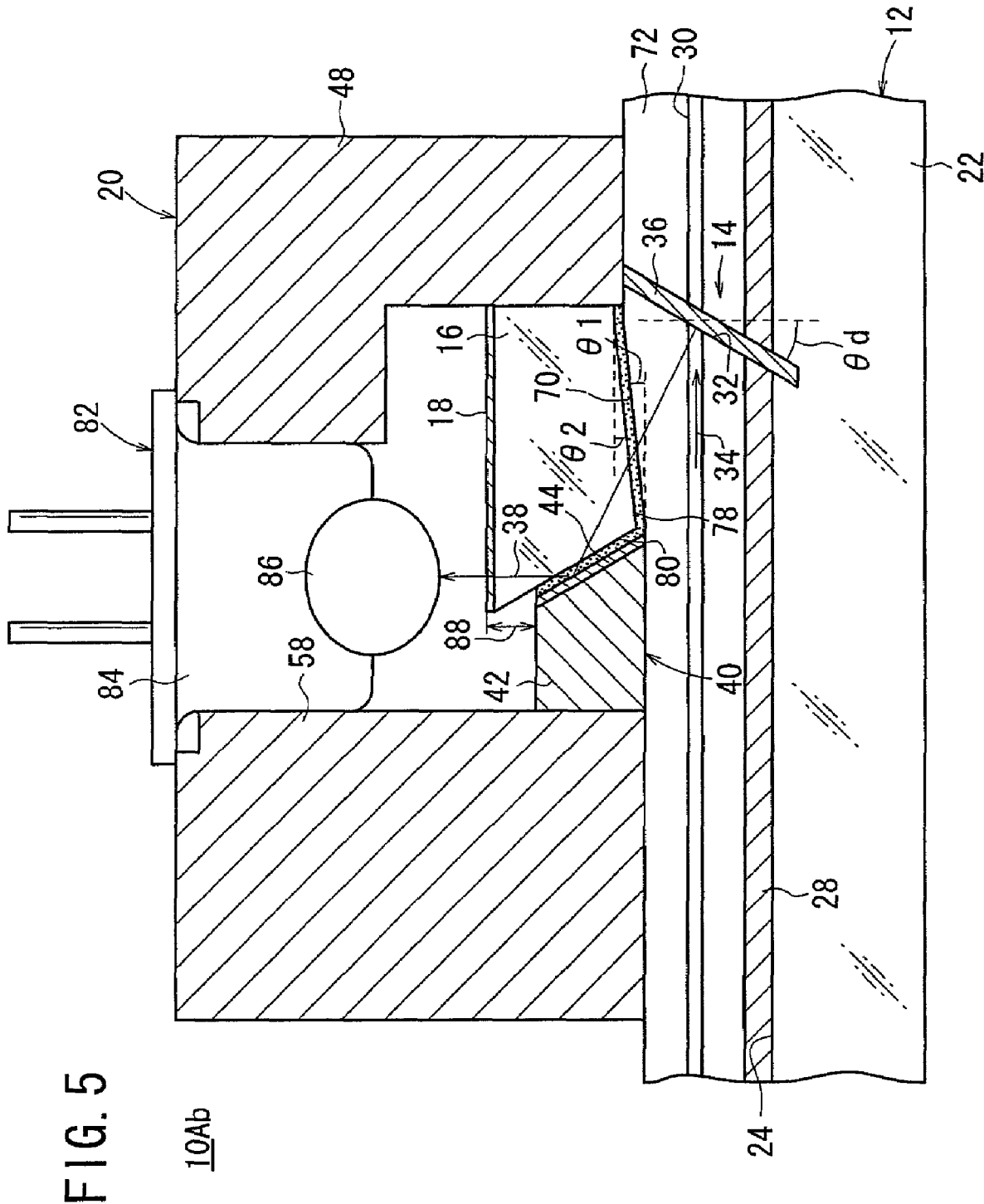
FIG. 5 is a fragmentary cross-sectional view of a second modification of the first optical device.

As shown in FIG. 5, an optical device 10Ab according to a second modification differs from the optical device 10Aa according to the first modification in that the guide 42 of the optical path changer 40 and the waveguide 16 with the filter 18 disposed on the upper surface thereof are accommodated in the first through hole 58 in the housing 48.

The optical device 10Ab allows the filter 18 (thin film) to be formed in a reduced area for efficiently utilizing the thin film of the filter 18. A step 88 having a dimension ranging from 0.03 to 0.15 mm should preferably be disposed between the upper surface of the guide 42 and the upper surface of the waveguide 16. The step 88 is effective to prevent the refractive index matching agent 80 from protruding onto the surface of the filter 18 when the guide 42 and the waveguide 16 are installed in place.

Figure 6:
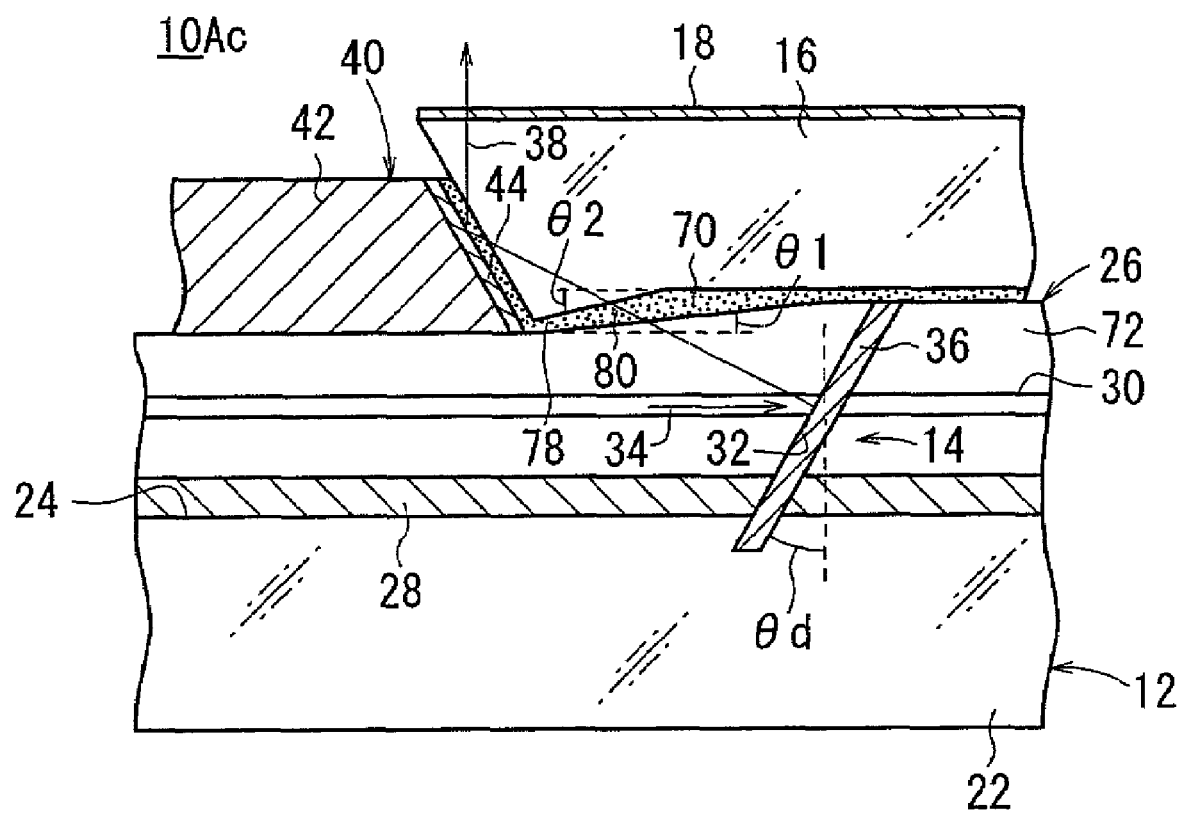
FIG. 6 is a fragmentary cross-sectional view of a third modification of the first optical device.

As shown in FIG. 6, an optical device 10Ac according to a third modification resides in that the angle θ1 formed between the first tapered surface 70 of the optical fiber 26 and the optical axis of the optical fiber 26 is different from an angle θ2 formed between the second tapered surface 78 of the waveguide 16 and the optical axis of the optical fiber 26, and these angles θ1, θ2 are related to each other as θ2>θ1. This angle relationship is further effective to prevent the refractive index matching agent 80 placed between the optical fiber 26 and the waveguide 16 from acting as a thin film.

Figure 7:
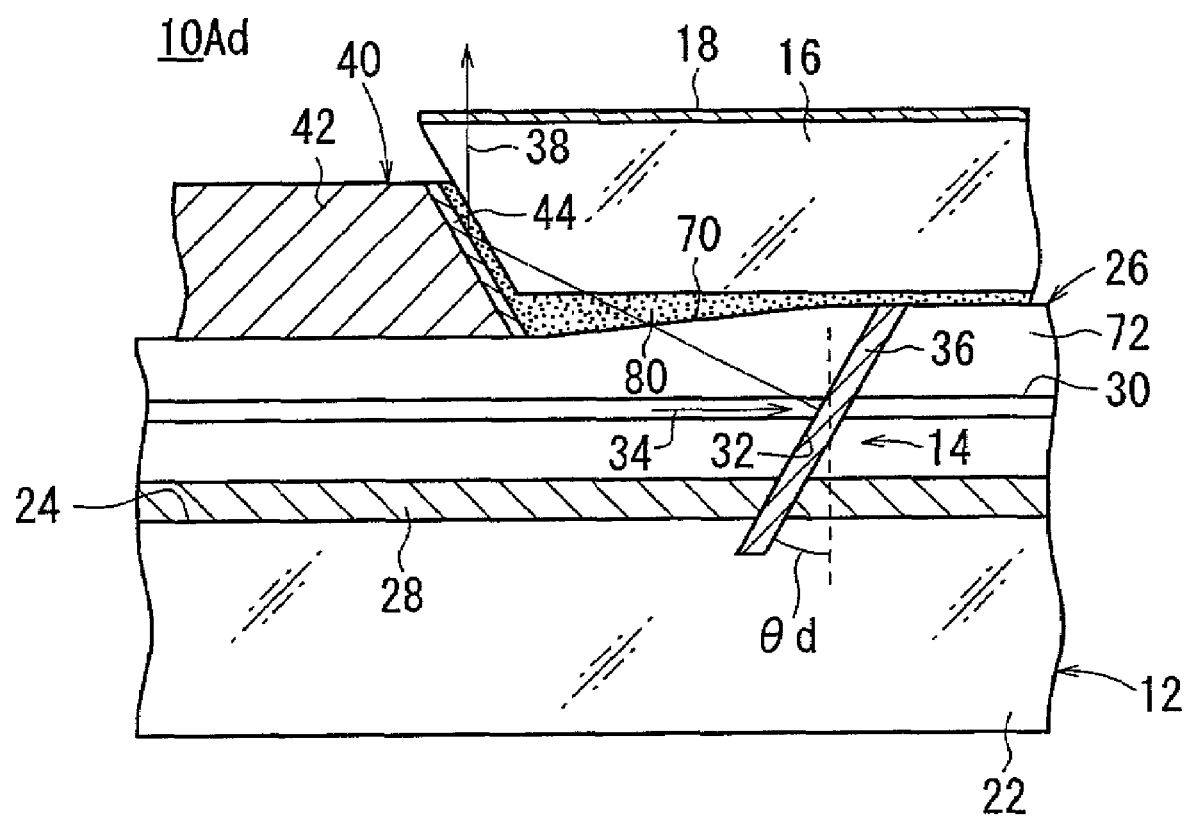
FIG. 7 is a fragmentary cross-sectional view of a fourth modification of the first optical device.

As shown in FIG. 7, an optical device 10Ad according to a fourth modification differs in that the surface of the waveguide 16 which faces the first tapered surface 70 of the optical fiber 26 is not a tapered surface, but a flat surface. Since the waveguide 16 with the flat surface can easily be fabricated, the cost of the optical device 10Ad is relatively low.

An optical device according to a second embodiment of the present invention (hereinafter referred to as a second optical device 10B) will be described below with reference to FIGS. 8 and 9.

Figure 8:
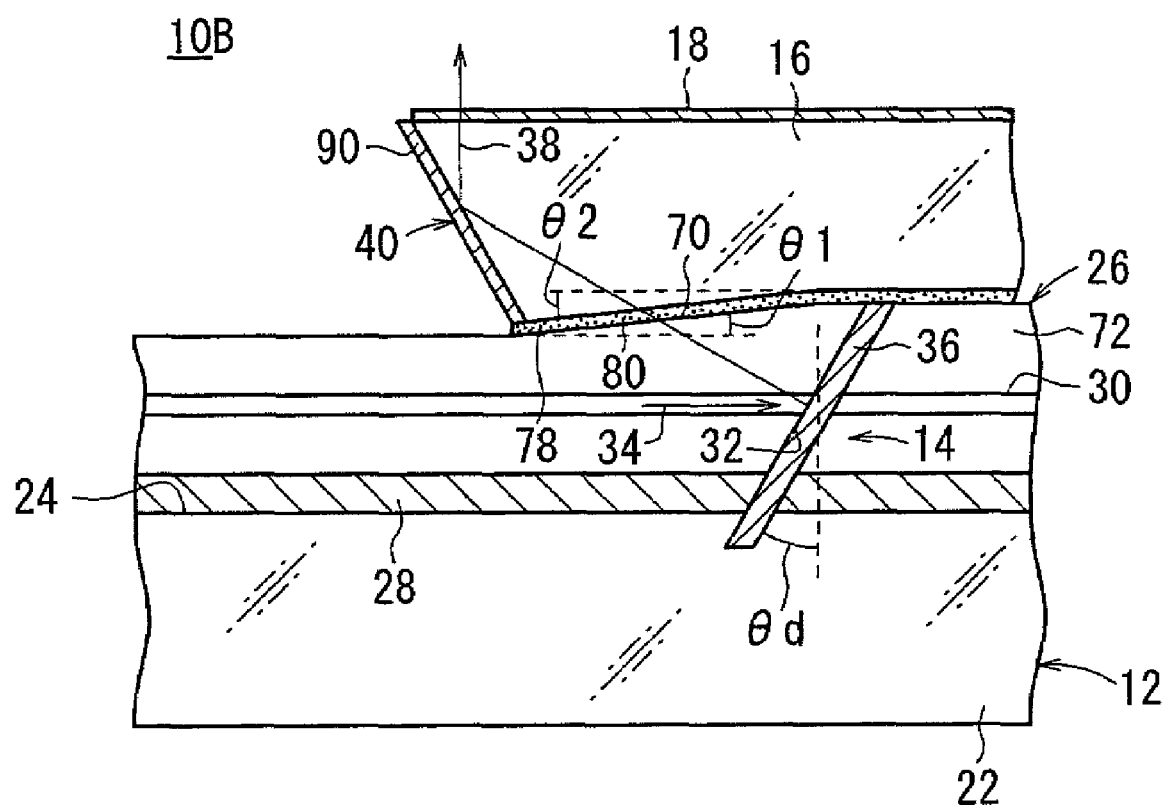
FIG. 8 is a fragmentary cross-sectional view of a second optical device according to the present invention.

As shown in FIG. 8, the second optical device 10B is of substantially the same structure as the first optical device 10A except that the optical path changer 40 comprises a totally reflecting film 90 disposed on the end face of the waveguide 16 which is present on the optical path of the demultiplexed optical signal beam 38, and the guide 42 (see FIG. 1) is dispensed with. The totally reflecting film 90 may comprise a thin metal film of Au (gold), Al (aluminum), or the like.

With the structure of the second optical device 10B, the waveguide 16 can have a function to change the optical path of the demultiplexed optical signal beam 38 without the need for the guide 42 on the optical fiber 26. The second optical device 10B is thus made up of a reduced number of parts, is manufactured by a simpler manufacturing process, suffers reduced manufacturing and assembling errors, and has the production efficiency improved.

Figure 9:
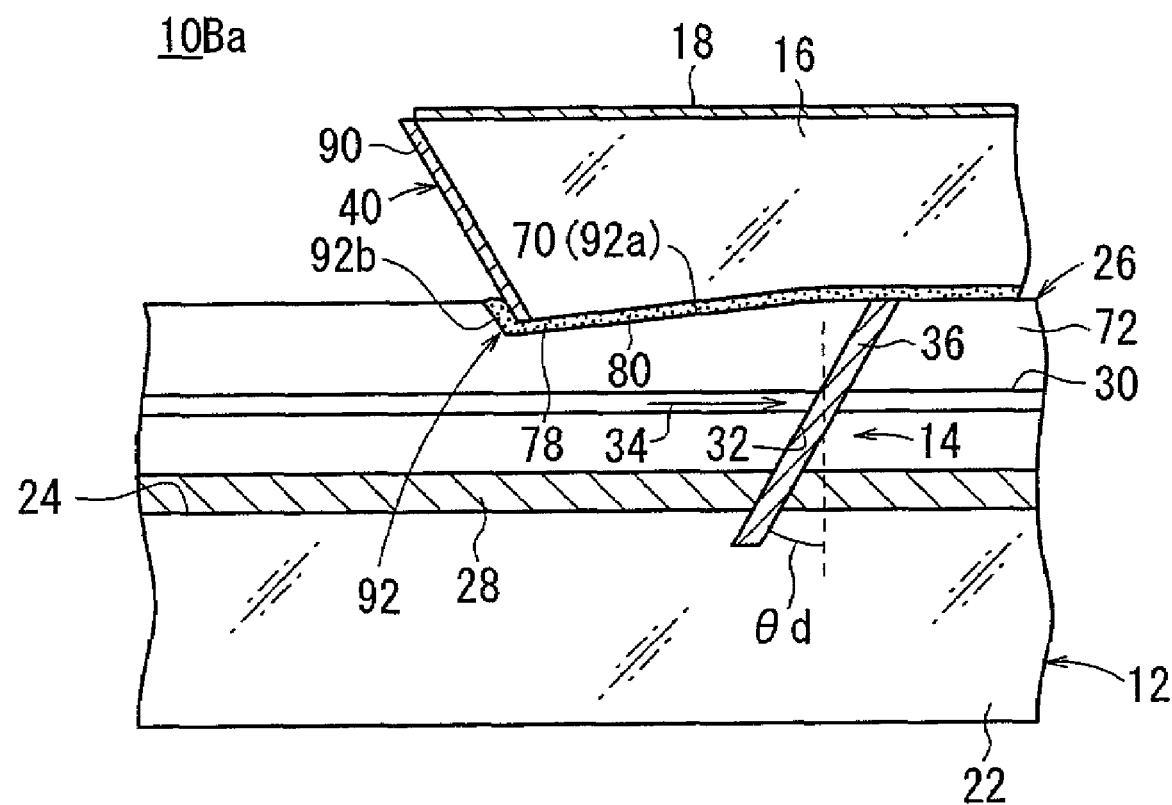
FIG. 9 is a fragmentary cross-sectional view of a modification of the second optical device.

FIG. 9 shows an optical device 10Ba according to a modification of the second optical device 10B. As shown in FIG. 9, the optical fiber 26 has a V-shaped groove 92 defined in the surface thereof and having an axis extending perpendicularly to the optical axis of the optical fiber 26. The V-shaped groove 92 is defined between two side surfaces 92a, 92b. One of the side surfaces 92a serves as the first tapered surface 70 of the optical fiber 26 which faces the second tapered surface 78 of the waveguide 16. The other side surface 92b doubles as a positioning member for positioning the waveguide 16 with respect to the optical fiber 26. Therefore, the waveguide 16 can be positioned with ease, allowing the optical device 10Ba to be assembled in a shorter period of time according to a simpler assembling process.

In the second optical device 10B and the modified optical device 10Ba, the angle θ1 formed between the first tapered surface 70 of the optical fiber 26 and the optical axis of the optical fiber 26 and the angle θ2 formed between the second tapered surface 78 of the waveguide 16 and the optical axis of the optical fiber 26 may be identical to or different from each other.

Although certain preferred embodiments of the present invention have been shown and described in detail, it should be understood that various changes and modifications may be made therein without departing from the scope of the appended claims.

What is claimed is:

1. An optical device comprising:
    an optical fiber mount with an optical fiber disposed thereon; and
    an optical demultiplexer for demultiplexing a portion of an optical signal beam transmitted through said as a demultiplexed optical signal beam, and guiding the demultiplexed optical signal beam out of said optical fiber;
    wherein said optical fiber has a tapered surface for emitting said demultiplexed optical signal beam therethrough, and said tapered surface is spaced from an optical axis of said optical fiber by a distance which is progressively greater along a direction in which said optical signal beam travels through said optical fiber.

2. An optical device comprising:
    optical fiber mount with an optical fiber disposed thereon; and
    an optical demultiplexer or demultiplexing a portion of an optical signal beam transmitted through said optical fiber, as a demultiplexed optical signal beam, and guiding the demultiplexed optical signal beam out of said optical fiber;
    wherein said optical fiber has a tapered surface for emitting said demultiplexed optical signal beam therethrough, and
    wherein said optical demultiplexer has a slit defined in said optical fiber across an optical axis thereof, and an optical demultiplexing member inserted in the slit for demultiplexing the portion of the optical signal beam transmitted said optical fiber;

said optical device further comprising:
an optical path changer for changing an optical path of said demultiplexed optical signal beam guided out of said optical fiber;
a waveguide serving as at least a medium from which said demultiplexed optical signal beam is emitted to said optical path changer; and
a filter disposed on a surface of said waveguide.

3. An optical device according to claim 2, wherein said waveguide serves as a medium from which said demultiplexed optical signal beam is emitted to said optical path changer and to which said demultiplexed optical signal beam is emitted from said optical path changer.

4. An optical device according to claim 2, wherein said optical demultiplexing member comprises a wavelength demultiplexing filter, and said filter comprises a bandpass filter for passing a light beam in a particular wavelength range of said demultiplexed optical signal beam.

5. An optical device according to claim 2, wherein said waveguide is disposed directly above said optical fiber.

6. An optical device according to claim 2, further comprising a refractive index matching agent placed between at least a surface of said optical fiber and said waveguide.

7. An optical device according to claim 2, wherein said waveguide has a surface facing a surface of said optical fiber and extending substantially parallel to the optical axis of said optical fiber.

8. An optical device according to claim 2, wherein said waveguide has a tapered surface facing a surface of said optical fiber.

9. An optical device according to claim 8, wherein said tapered surface of said waveguide extends substantially parallel to said tapered surface of said optical fiber.

10. An optical device according to claim 8, wherein said tapered surface of said optical fiber is inclined at an angle $\theta 1$ to the optical axis of said optical fiber, and said tapered surface of said waveguide is inclined at an angle $\theta 2$ to the optical axis of said optical fiber, said angle $\theta 1$ and said angle $\theta 2$ being different from each other.

11. An optical device according to claim 2, wherein said optical path changer comprises:
a guide, said waveguide and said guide being juxtaposed on a surface of said optical fiber; and
a totally reflecting film disposed on an end face of said guide which faces said waveguide.

12. An optical device according to claim 11, wherein said tapered surface of said optical fiber doubles as a positioning member for positioning said guide with respect to said optical fiber.

13. An optical device according to claim 2, wherein said optical path changer comprises a totally reflecting film disposed on an end face of said waveguide which is present on the optical path of said demultiplexed optical signal beam.

14. An optical device according to claim 2, wherein said tapered surface of said optical fiber comprises a side surface of a V-shaped groove defined in a surface of said optical fiber.

15. An optical device according to claim 14, wherein said V-shaped groove has an other side surface doubling as a positioning member for positioning said waveguide with respect to said optical fiber.

16. An optical device according to claim 2, further comprising a light-detecting unit disposed on the optical path of said demultiplexed optical signal beam which has passed through said filter disposed on the surface of said waveguide.

* * * * *

UNITED STATES PATENT AND TRADEMARK OFFICE
CERTIFICATE OF CORRECTION

PATENT NO. : 7,373,051 B2  Page 1 of 1
APPLICATION NO. : 11/668648
DATED : May 13, 2008
INVENTOR(S) : Akiyoshi Ide and Yasunori Iwasaki It is certified that error appears in the above-identified patent and that said Letters Patent is hereby corrected as shown below:

Column 12

*Line 42*: please add --optical fiber,-- after "said"

*Line 53*: please add --an-- before first occurrence of "optical"

*Line 67*: please add --through-- after "transmitted"

Signed and Sealed this

Twenty-ninth Day of July, 2008

JON W. DUDAS
*Director of the United States Patent and Trademark Office*